United States Patent
Shamsaasef et al.

(10) Patent No.: US 12,088,698 B2
(45) Date of Patent: Sep. 10, 2024

(54) SYSTEM AND METHOD FOR SECURELY DELIVERING KEYS AND ENCRYPTING CONTENT IN CLOUD COMPUTING ENVIRONMENTS

(71) Applicant: ARRIS Enterprises LLC, Suwanee, GA (US)

(72) Inventors: Rafie Shamsaasef, San Diego, CA (US); Lawrence Cook, Santee, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 264 days.

(21) Appl. No.: 17/848,089

(22) Filed: Jun. 23, 2022

(65) Prior Publication Data

US 2022/0417001 A1    Dec. 29, 2022

Related U.S. Application Data

(60) Provisional application No. 63/214,132, filed on Jun. 23, 2021.

(51) Int. Cl.
*H04L 9/08* (2006.01)
*H04L 67/10* (2022.01)

(52) U.S. Cl.
CPC .............. *H04L 9/083* (2013.01); *H04L 67/10* (2013.01)

(58) Field of Classification Search
CPC ....... H04L 9/083; H04L 67/10; H04L 9/0894; H04L 2209/16; H04L 2209/60; H04L 9/0618
See application file for complete search history.

(56) References Cited

U.S. PATENT DOCUMENTS 8,819,843 B2 * 8/2014 Kannan ............ H04N 21/26606
    726/27
9,716,696 B2   7/2017 Narayan et al.
(Continued)

FOREIGN PATENT DOCUMENTS

CN    101827248 A  *  9/2010  ........... H04L 9/0836
CN    1679066 B        8/2011
(Continued)

OTHER PUBLICATIONS

"Re-encryption use cases; ECI(15)006006_Re-encryption_use_cases", ETSI Draft; ECI(15)006006_RE-Encryption_Use_Cases, European Telecommunications Standards Institute (ETSI), 650, Route Des Lucioles; F-06921 Sophia-Antipolis ; France, vol. ISG—ECI, Mar. 13, 2015 (Mar. 13, 2015), pp. 1-33, XP014238421, [retrieved on Mar. 13, 2015] the whole document.
(Continued)

*Primary Examiner* — Carl G Colin
*Assistant Examiner* — Hany S. Gadalla
(74) *Attorney, Agent, or Firm* — Chernoff, Vilhauer, McClung & Stenzel, LLP

(57) ABSTRACT

A cloud-based system and method for encrypting media content is disclosed. The system comprises a key server microservice, for receiving control word requests and for generating encoded control words and a software encryption microservice, communicatively coupled to the key server microservices, the encryption microservice for receiving the media content, for generating the control word requests, for receiving the encoded control words, and for white-box encrypting the media content according to the generated encoded control words.

19 Claims, 8 Drawing Sheets

(56) References Cited

U.S. PATENT DOCUMENTS

| | | | | |
|---|---|---|---|---|
| 2007/0253551 | A1* | 11/2007 | Guillot | H04N 21/44231 |
| | | | | 348/E7.056 |
| 2009/0028331 | A1* | 1/2009 | Millar | H04N 7/17318 |
| | | | | 380/255 |
| 2010/0211797 | A1* | 8/2010 | Westerveld | H04N 21/4367 |
| | | | | 713/185 |
| 2011/0268271 | A1* | 11/2011 | Benedetti | H04N 21/4623 |
| | | | | 380/239 |
| 2015/0163054 | A1* | 6/2015 | Roelse | H04L 9/0631 |
| | | | | 380/278 |
| 2016/0050190 | A1 | 2/2016 | Mooij et al. | |
| 2017/0373828 | A1* | 12/2017 | Michiels | G06F 21/75 |
| 2018/0083933 | A1* | 3/2018 | Mullen | H04L 63/0478 |
| 2018/0167197 | A1* | 6/2018 | Anderson | H04L 9/002 |
| 2019/0222878 | A1* | 7/2019 | Cocchi | H04N 5/913 |
| 2020/0044837 | A1* | 2/2020 | Bos | H04W 12/041 |

FOREIGN PATENT DOCUMENTS

| | | |
|---|---|---|
| CN | 103107889 B | 5/2013 |
| CN | 106604070 B | 4/2017 |
| EP | 2326043 A1 | 5/2011 |

OTHER PUBLICATIONS

Diaz-Sanchez D et al: "Sharing conditional access modules through the home network for pay TV access", IEEE Transactions on Consumer Electronics, IEEE Service Center, New York, NY, US, col. 55, No. 1, Feb. 1, 2009 (Feb. 1, 2009), pp. 88-96, XP011255260, ISSN: 0098-3063, DOI: 10.1109/TCE.2009.4814419 sections II-V, figures 1-5.

International Search Report and Written Opinion RE: Application No. PCT/US22/34768, dated Oct. 7, 2022.

* cited by examiner

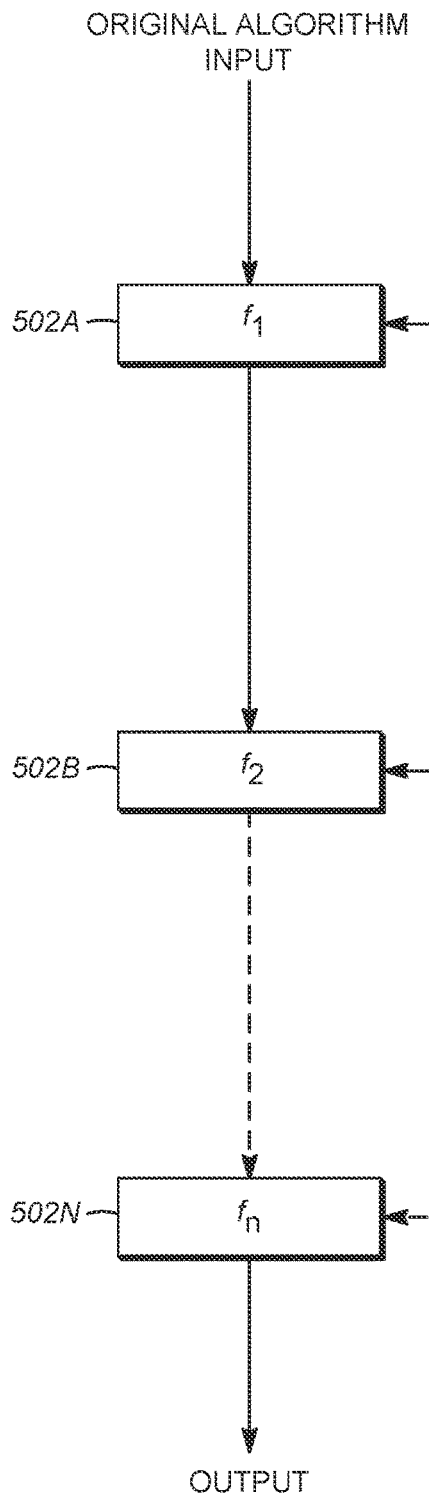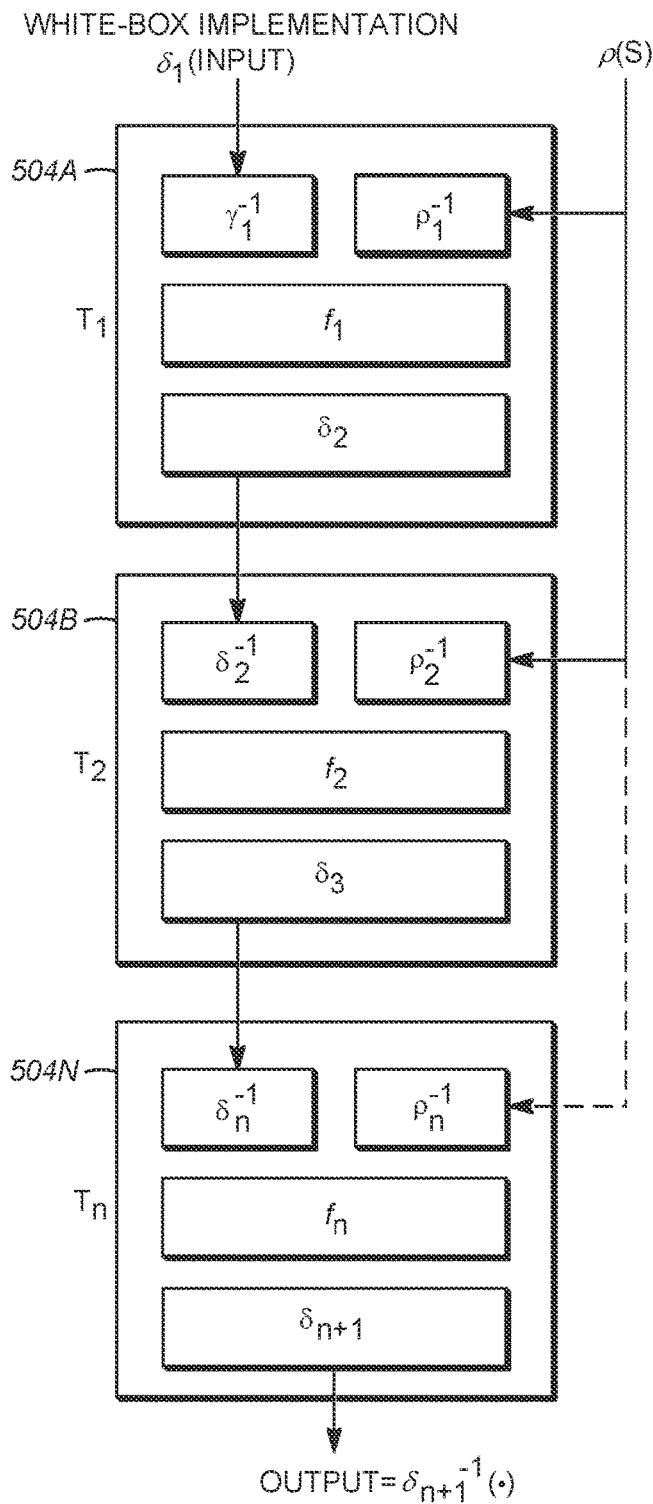
FIG. 5A
FIG. 5B

SYSTEM AND METHOD FOR SECURELY DELIVERING KEYS AND ENCRYPTING CONTENT IN CLOUD COMPUTING ENVIRONMENTS

CROSS-REFERENCE TO RELATED APPLICATIONS

The present application claims priority to U.S. Provisional App. No. 63/214,132 filed Jun. 23, 2021, the content of which is incorporated herein by reference in its entirety.

BACKGROUND

1. Field

The present disclosure relates to systems and methods for encrypting media content, and in particular to a system and method for securely encrypting media content in cloud computing environments.

2. Description of the Related Art

Content distribution systems (CDS) for dissemination of media programs are known in the art. Such systems usually comprise specialized equipment at the content or service provider. Security of on-premises equipment also typically relies on equipment being supported by servers being isolated with no external access.

Before transmission of such media programs, content protection is typically employed to prevent unauthorized reception. Such protection is provided by content protection systems that typically use hardware accelerated services of a specific vendor's Hardware Security Module (HSM).

There is a desire to increase the flexibility of such content distribution systems to support differing content protection schemes, and also to virtualize key elements of the CDS. Unfortunately, typical CDSs are hard to virtualize and inflexible.

The rigid structure of discrete function on-premises equipment presents architectural security challenges making migration to public or even hybrid cloud environments difficult. For example, CASs with proprietary secrets must be implemented in HSMs or isolated servers to maintain sufficient security making it difficult to virtualize in the public or hybrid cloud. Also, Conditional Access (CA) applications deployed in the cloud typically lack provisions to secure secret data and code statically or at runtime. Key delivery messages and mechanisms are typically tightly coupled with actual content encryption and are localized making distribution difficult. A modular micro-service architecture is needed to accommodate the cloud virtualized environment.

SUMMARY

To address the requirements described above, this document discloses a system and method for encrypting media content. In one embodiment, the system comprises a key server microservice, for receiving control word requests and for generating encoded control words and a software encryption microservice, communicatively coupled to the key server microservices, the encryption microservice for receiving the media content, for generating the control word requests, for receiving the encoded control words, and for white-box encrypting the media content according to the generated encoded control words. In this embodiment, the key server microservice and the encryption microservice are hosted in a cloud. Another embodiment is evidenced by a method for encrypting media content. The method comprises receiving, in a key server microservice hosted in the cloud, a request to generate an encoded control word for encrypting media content; generating, in the key server microservice, the encoded control word according to entitlement information; transmitting the encoded control word to a software encryption microservice hosted in the cloud; and white-box encrypting the media content according to the encoded control word in the software encryption microservice. In another embodiment, the method is evidence by transmitting, to a key server microservice hosted in the cloud, a request to generate an encoded control word for encrypting media content; receiving the encoded control word to a software encryption microservice hosted in the cloud, the encoded control word generated by the key server microservice according to entitlement information; and white-box encrypting the media content according to the encoded control word in the software encryption microservice. Still another embodiment is evidenced by one or more processors, communicatively coupled to one or more memories that store processor instructions for commanding the processors to perform the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIGS. 5A and 5B are diagrams of a cryptographic system processing an input message to produce an output message, and its corresponding white-box implementation;

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Described herein is a cloud-based architecture with micro-services to securely deliver CA keys and perform multimedia encryption in the cloud without exposing secrets. The micro-services in this architecture are flexible and facilitate migration to any cloud environment. The key server component of the proposed architecture separates CA key control messages from actual content encryption without exposing secrets. The adaptive internal structure of key server components allows using a vendor-specific HSM (if needed) to provide extra level of security while remaining transparent to the rest of the cloud based system. The use of white-box cryptography to perform content encryption in software makes the encryptor application atomic and a self-contained module in the cloud. Thus amenable for a containerized environment such as DOCKER. The security interfaces between various modules within the proposed framework use RESTful APIs with JSON objects for compatibility with most existing cloud services.

Content Distribution System

Figure 1:
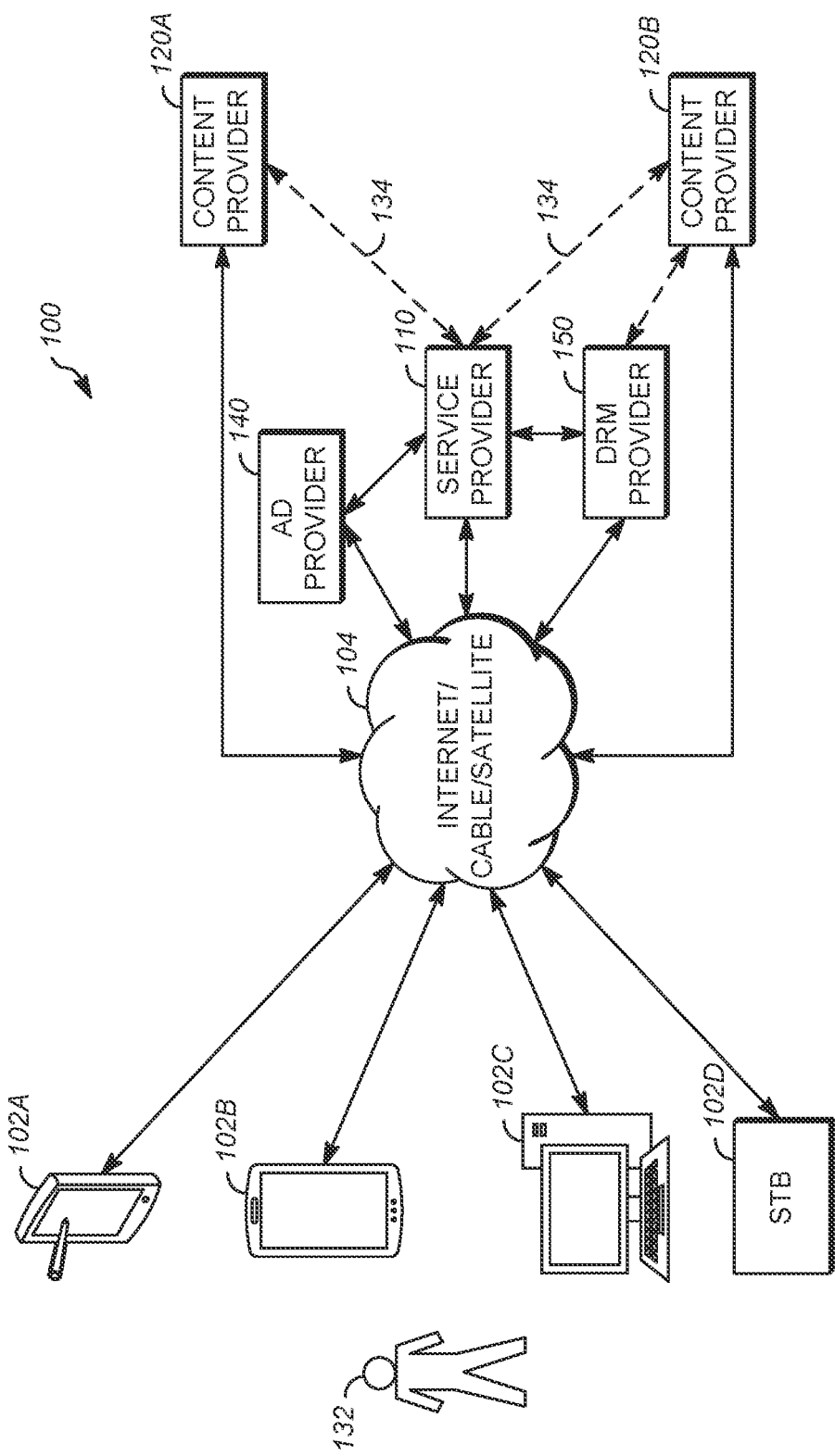
FIG. 1 is a diagram illustrating an exemplary content distribution system.

FIG. 1 is a diagram illustrating an exemplary content distribution system (CDS) 100. In the illustrated embodiment, the CDS 100 may comprise one or more content providers 120A, 120B (hereinafter, content provider(s) 120), in communication with a communication network 104 such as the Internet, a cable system, or a satellite system. One example of a content provider is HOME BOX OFFICE (HBO).

The CDS 100 transmits content data having content to one or more service providers 110 and one or more client devices 102A-102D, also alternatively referred to herein as client devices 102. Such client devices 102 may include a tablet 102A, a smartphone 102B, a desktop or laptop computer 102C and/or a set top box (STB) 102D. client devices 102 may both be enabled to receive content from the service provider 110 or directly from the content providers 120.

Typically, content providers 120 own the rights to the media programs (alternatively referred to hereinafter as "content" ultimately presented to consumers. Content providers 120 may own such rights because they created the content itself, or by transfer of rights from the authors or former owners of the content.

In one service paradigm, content providers 120 transmit content to one or more service providers 110 (typically over high bandwidth secure communication links 134). Such links may be implemented via satellite, cable, or other medium. Service providers 110 transmit the content to the client devices 102. One example of a service provider is a cable service such as SPECTRUM, satellite broadcast system such as DISH or Over-the-Top (OTT) service. In a second service paradigm, the content providers 120 transmit content directly to client devices 102.

In the first service paradigm, the service provider 110 licenses the content from the content providers 120. In the second service paradigm, the content provider 120 license the content directly to the client devices 102. Content providers 120 may also be service providers 110 and vice versa (for example, HULU creates content and distributes it).

The content providers 120 and service providers 110 each may include one or more video servers and one or more databases for storing and transmitting content. Content providers 120 and service providers 110 may transmit content data to the client devices 102 via the Internet, cable transmission system, satellite transmission system, or terrestrial transmission, and such transmission may comprise a broadcast (e.g. transmission to any client device 102 via a communication channel shared by the client devices 102, multicast (e.g. transmission to a pre-specified group of client devices 102), or by OTT video-on-demand and/or streaming.

The content data transmitted to client devices 102 includes the content itself (e.g. the video and audio data that together comprise the program of content) as well as other data appurtenant to the content provided to the client device 102 and used to support the decompression and decoding of the content or otherwise present the content. Such appurtenant data can include, for example, clock references, program identifiers, conditional access data, catalogs of media programs and the like.

Using the client devices 102, remote users 132 can also communicate data with the service provider(s) 110 or content provider(s) 120 using the communication network 104.

The CDS 100 may also comprise one or more advertisement providers 140, which supply advertising content that is presented conjunction with the content, typically at intervals within the content. In the illustrated embodiment, the advertisement provider 140 includes an advertisement provider server communicatively coupled to an associated and communicatively coupled advertisement provider database.

As there is value in restricting access to media program to paying subscribers, the CDS 100 typically include a digital rights management (DRM) system. Typically, the DRM system operates by encrypting, encoding, or otherwise obfuscating the media content in such a way that only authorized client devices 102 can decrypt, decode or deobfuscate the media content. In some embodiments, the DRM system is implemented and managed by the service provider 110 or content provider 120, and the service provider 110 or content provider 120 encrypt the media content and provide the means to decrypt the media content to authorized client devices 102. In other embodiments, the DRM system is provided by a third party DRM provider 150, which provides the means by which the service provider 110 or content provider 120 encrypt the media content (for example, encryption algorithms, encryption keys and related hardware or software if any), and also provide the means to the client devices 102 or the service provider 110, to decrypt the content for decryption, re-encryption and transmission (in the case of transmission to the service provider 110) or for playback (e.g. decryption keys, software, and related hardware if any) in the case of transmission to the client devices 102. The means to decrypt or decode the media content is typically provided in a license transmitted to the client device. DRM services may be provided by the service provider 110, the content provider 120, or an independent (not owned or managed by a service provider 110 or content provider 120) entity.

Figure 2:
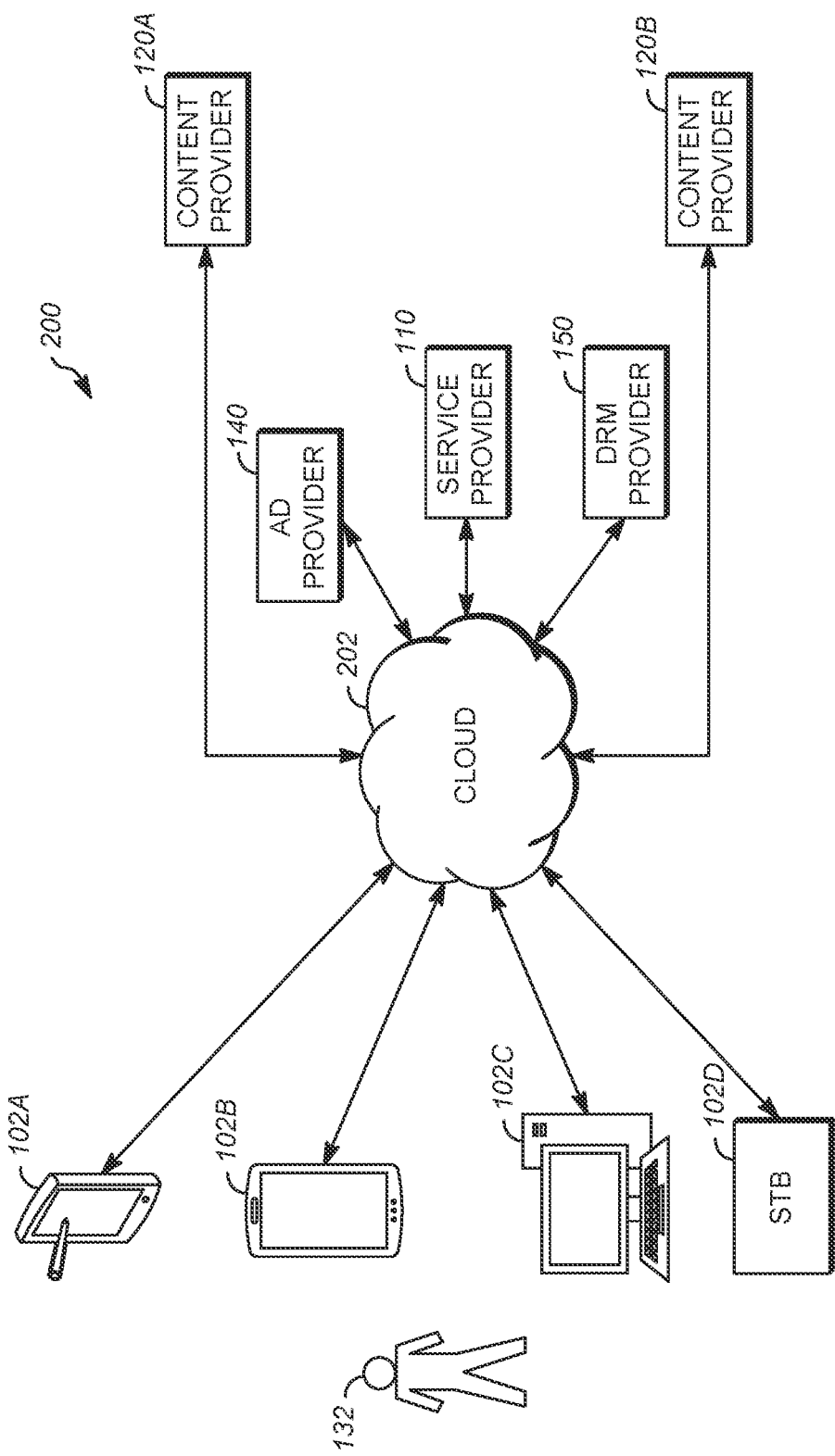
FIG. 2 is a diagram of a cloud-based content distribution system.

FIG. 2 is a diagram of a cloud-based CDS 220. In this embodiment, while communications between one or more of the communication links between the elements may be implemented as shown in FIG. 1, communications and substantial computations are performed via the cloud 202. This permits flexibility in where such computations are located and permits enhanced scalability. However, computations in the cloud 202, in some cases by entities not controlled directly by the entity desiring the communications, may not be secure. This is particularly problematic when the computations require keys and other data that must not be publicly disseminated.

Architecture

A typical cloud content protection architecture receives MPEG2-TS clear content from media content provider via an encoder, adds access rights, multiplexes the audio, video, PSI, and ECMs, create streams with multiple media programs, encrypts, and delivers the encrypted streams to modulator servers for distribution to end user devices.

Disclosed is a key server microservice that processes or optionally generates both EMMs and ECMs, creates conditional access control words for content encryption, and encodes or encrypts control words for delivery to software encryptor. Also disclosed is a software encryption microservice that securely receives control words (CWs) from the key server microservice as well as clear MPEG2-TS media content from the processing app and encrypts the media content using the encoded CWs within a software whitebox.

Figure 3:
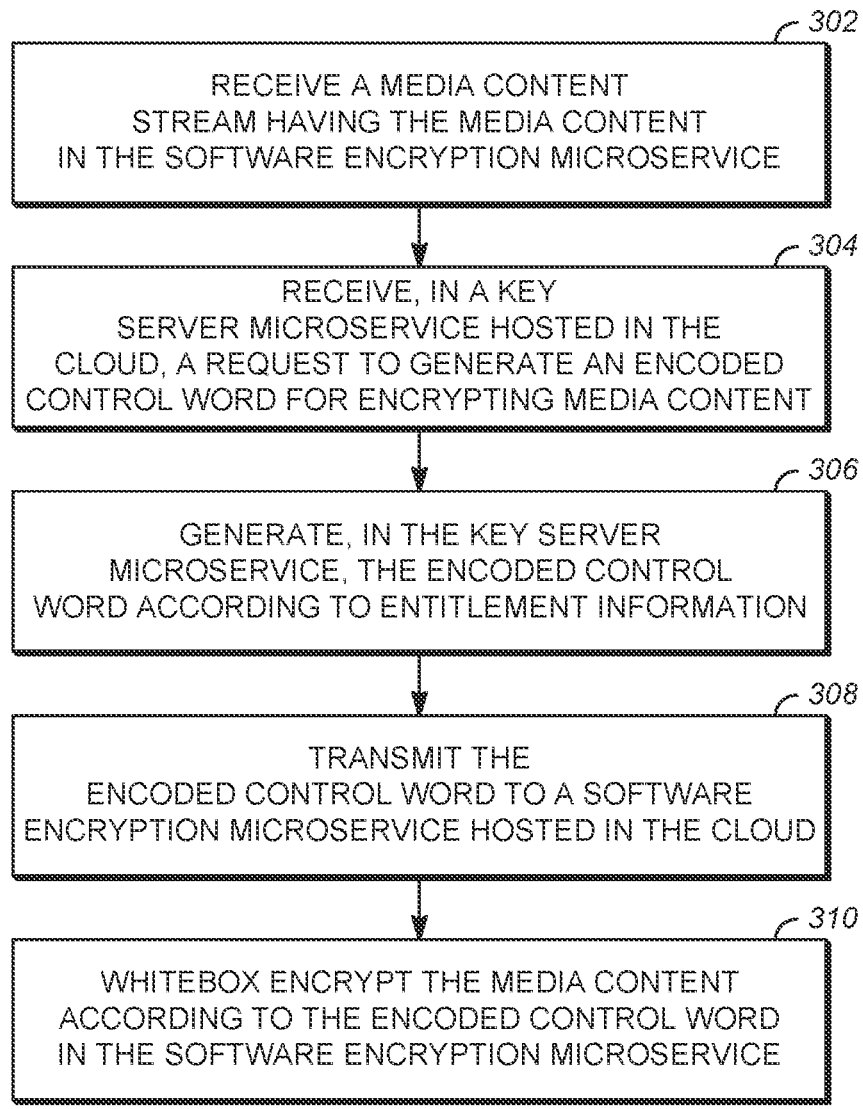
FIG. 3 is a diagram illustrating exemplary operations that can be used for secure cloud-based encryption of media content.
Figure 4:
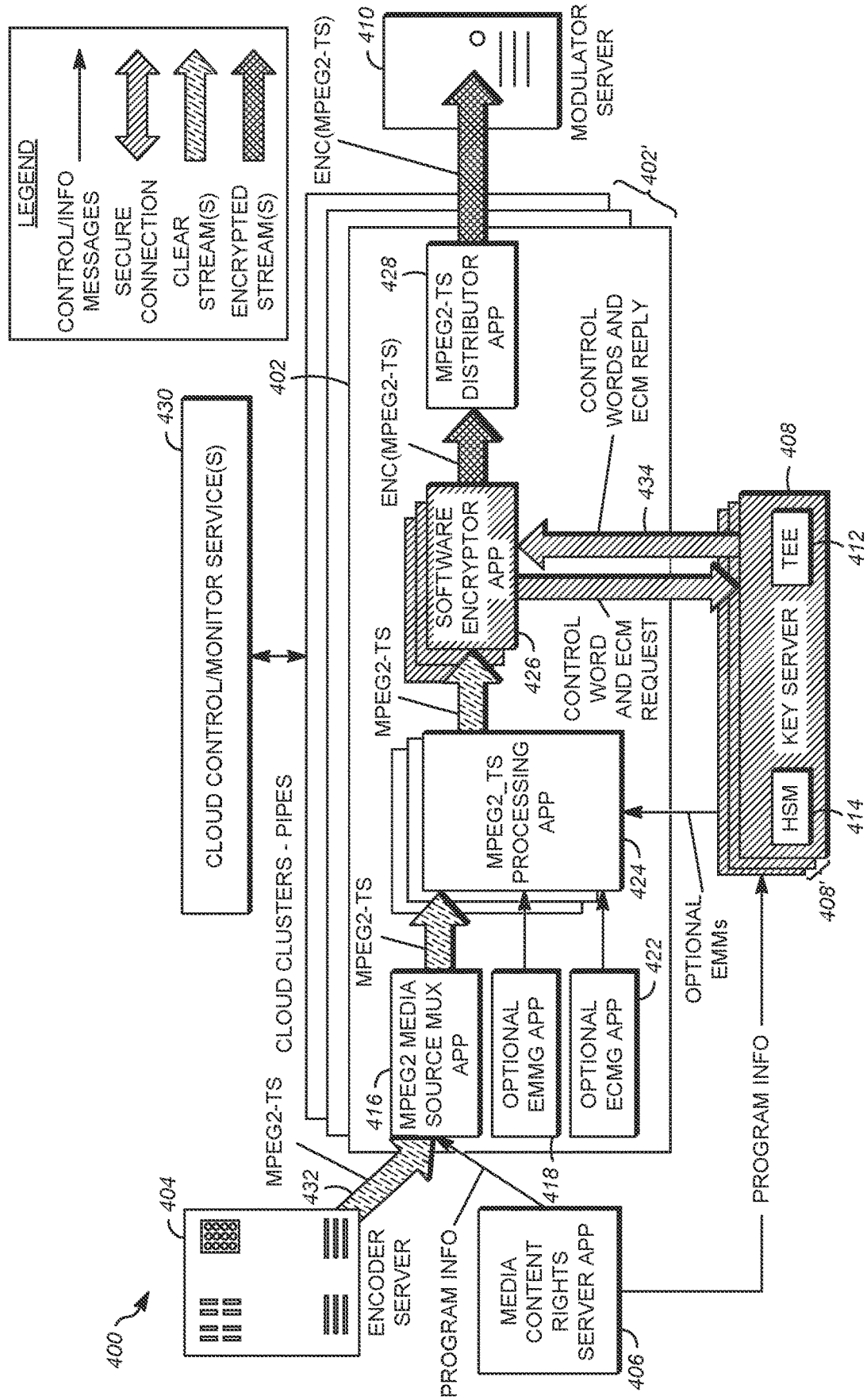
FIG. 4 is a diagram illustrating the architecture of the cloud-based content distribution system.

FIG. 3 is a diagram illustrating exemplary operations that can be used for secure cloud-based encryption of media content. FIG. 3 will be discussed in conjunction with FIG. 4, which is a diagram illustrating the architecture of the cloud based CDS 400.

Turning first to FIG. 3, block 302 receives a media content stream having media content in a software encryption microservice 426. In one embodiment, this is performed as follows. Encoder server 404 takes media content and encodes it into a suitable transport stream, for example, MPEG2-TS. That transport stream is provided from the encoder 404 of a media content provider to one of a plurality 402' of cloud clusters or data pipes 402. Each cloud cluster 402 implements a plurality of processing modules including a source multiplexer module 416, an optional entitlement management message generator (EMMG) module 418, an optional entitlement control message generator (ECMG) module 422, a transport stream processor module 424, a software encryption microservice module 426, and a transport stream distribution module 428. The source multiplexer module 416 accepts the transport streams from the encoder server 404 and media content information, including media content rights information from the media content rights module 406, multiplexes the transport stream with other transport streams from other encoder servers, integrates the media content information as needed and provides the result to the transport stream processing module 424. Such programming information may include the EMM/ECMs, audio and/or video program identifiers (used to determine identify which packets in the transport stream refer to a particular media program), media program start time and duration, and program guide information (which identifies which media programs are transmitted with a particular program identifier and describes such media programs). The transport stream processing module 424 accepts the multiplexed transport stream, as well as entitlement information including entitlement management messages (EMMs) and entitlement control messages (ECMs), and adds the EMMs and ECMs to the transport streams. The resulting transport stream (which includes packetized media content, EMMs, ECMs, and other information is provided to the software encryption microservice 426 for further processing as described below EMMs are messages that are used to deliver entitlement keys Ke as well as associated metadata that defines the usage rules of the delivered entitlement keys. Entitlement keys may be changed on a regular basis (e.g., monthly). Various types of entitlement keys may exist depending on the type of entitlement/authorization. Such keys might include broadcast keys for content that is broadcast to all media content recipients, service keys for the services subscribed to by a particular media content recipient, unique keys for delivery of content specifically to that media content recipient and transaction keys for transaction authentication. Entitlement control messages (ECM) are used to deliver the specific media content encryption keys Kc (otherwise known as control words), and optionally associated media content metadata that specifies the usage rules of the media content.

In one embodiment, the EMMs are generated by the EMMG module 416, and the ECMs are generated by the EMMG module 418 and either or both are provided to the transport stream processing module 424. In another embodiment, EMMs and/or ECMs are instead generated from media content information provided to the key server microservice 408 by the media content rights module 406, and provided to the transport stream processing module 424. Such media content information can include, for example, entitlement keys Ke and/or content encryption keys Kc. The media content information may be encrypted before provision to the key server microservice 408, and decrypted in the key server microservice 408 by use of a dedicated hardware security module (HSM) 414 or processing in a trusted execution environment (TEE) 412. For example, the content encryption key Kc or entitlement key Ke may be encrypted by a secret key and/or algorithm by the media content rights module 406, and decrypted by the HSM 414 by use of the secret key or inverse algorithm.

Turning to FIG. 3, block 304 depicts receiving a request to generate an encoded control word for encrypting media content. The request is generated and transmitted by the software encryption microservice 426 and received by the key server microservice 408. The request may include, for example, packet identifiers or other means for identifying the media content packets for which the control word(s) is requested.

In block 306, the key server microservice 408 generates an encoded control word according to entitlement information. In an exemplary embodiment, the entitlement information comprises the control word or content encryption key Kc that will be encoded and used to encrypt the media content packets by the software encryption microservice 426. As described above, the entitlement information may be provided by the media content rights module 406 in encrypted or non-encrypted form, may be provided in the form of an EMM and/or ECM from the EMMG 418 and/or ECMG 422, or may be generated by the key server microservice 408. The generation of the encoded control word and the white-box encryptor that accepts and uses that encoded control word to encrypt the media program packets is described further below.

In block 308, the encoded control word is transmitted to the software encryption microservice 426, where it is received. As illustrated, the encoded control word can be transmitted to the software encryption microservice 426 in the form of an ECM having the control word, and optionally, the packet identifying information. In block 310, the software encryption microservice 426 white-box encrypts the media content according to the encoded control word. White-box encryption and the generation of the encoded control words is discussed below.

It is noteworthy that the communication path 434 by which the encoded control words are provided from the key server microservice to the software encryption microservice can be a different communication path or service 432 than that communication path or service that provides the media content to the software encryption microservice, or such communications may be implemented via the same communication path or service. Further, for modularity, the key server microservice 408 and the software encryption microservice 426 communicate according to a JavaScript Object Notation (JSON) format via representational state transfer (RESTful) application programming interfaces.

Representational State Transfer (REST) is an architectural style that specifies constraints, such as the uniform interface, that if applied to a web service induce desirable properties, such as performance, scalability, and modifiability, that enable services to work best on the Web. In the REST architectural style, data and functionality are considered resources and are accessed using Uniform Resource Identifiers (URIs), typically links on the Web. The resources are acted upon by using a set of simple, well-defined operations.

White-Box Cryptographic Systems

A white-box system operates by encoding data elements (such as secret keys) so that they cannot be recovered by an attacker in their cleartext form. A white-box implementation is generated with mathematically altered functions that operate directly on the encoded data elements without decoding them. This guarantees that the secrets remain encoded at all times, thus protecting the implementation against attackers with full access to and control of the execution environment. This is described, for example, in the Chow reference cited above.

FIGS. 5A and 5B are diagrams of a cryptographic system processing an input message to produce an output message, and its corresponding white-box implementation.

As illustrated in FIG. 5A, the algorithm performs functions $f_1$, $f_2$ and $f_n$ (502A, 502B, and 502N, respectively) when provided with an input and secret S analogous to the content encryption key Kc. Combined together, functions $f_1$, $f_2$ and $f_n$ perform the encryption of the media content packets.

In FIG. 5B, each operation $f_1, f_2, \ldots, f_n$ in an original algorithm $\mathcal{A}$(m, S) with input message m (the media content packets) and secret S is encoded as a lookup-table $T_1, T_2, \ldots, T_n$ (504A, 504B, and 504N, respectively) in the classical white-box implementation of that algorithm. The encodings are generated as two sequences of random bijections, $\delta_1, \delta_2, \ldots, \delta_{n+1}$ that are applied to the inputs and output of each operation, where $\ell(S)$ represents an encoded secret (e.g. an encoded secret key Kc), which is either linked statically or provided dynamically to the white-box implementation. Since the encoded secret $\ell(S)$ is provided instead of the secret itself, and since the operations within the white-box never reveal the secret S, the input (e.g. the media program) is encrypted without disclosing the secret S or encryption key Kc. The encrypted output can be decrypted via ordinary means, by use of key Kc. In cases where this is performed in secure equipment, this can be accomplished using an HSM or TEE in the receiving device, using white-box or standard decryption techniques.

In the white-box implementation shown in FIG. 5B this is implemented by applying bijections and $\ell(S)$ as an input to lookup table $T_1$ to obtain an intermediate output, applying the intermediate output and $\ell(S)$ to lookup table $T_2$ to produce a second intermediate output, then providing the second intermediate output and $\ell(S)$ to lookup table $T_3$ to produce output $\delta_{n+1}^{-1}(\cdot)$. Lookup table $T_1$ inverts the bijection $\delta_1$ of the input by $\delta_1^{-1}$, inverts the bijection $\ell$ of S ($\ell(S)$) by $\rho_1^{-1}$, applies $f_1$ and then applies bijection $\delta_2$ to produce the first intermediate output. Similarly, lookup table $T_2$ inverts the bijection $\delta_2$ of the first intermediate input by $\delta_2^{-1}$, inverts the bijection $\ell$ of S ($\ell(S)$) by $\rho_2^{-1}$, applies $f_1$ and then applies bijection $\delta_3$ to produce the first intermediate output. Generally, final lookup table $T_n$ inverts the bijection $\delta_n$ of the n-1$^{th}$ intermediate input by $\delta_n^{-1}$, inverts the bijection $\ell$ of S ($\ell(S)$) by $\rho_n^{-1}$, applies $f_n$ and then applies bijection $\delta_{n+1}$ to produce the intermediate output $\delta_{n+1}^{-1}(\cdot)$.

The encrypted media content packets (and EMMs and ECMs, if applicable) are then provided to a transport stream distributor module 428, to prepare the transport stream for transmission, for example, via server 410. Transmission can then be performed using wired or wireless transmission, via the internet or by dedicated communication links. A cloud control/monitor service 430 interfaces with the elements in the cloud clusters 402 to monitor and control the functions of these elements.

As described above, one or more of the elements in the cloud cluster 402 are implemented in the cloud 202, including the software encryption microservice 426. The key server microservice 408 may also be implemented in the cloud 202. In a full public cloud embodiment, the software encryption microservice 426 and key server microservice 408 execute in a public cloud. Other elements of the cloud clusters 402 may also be executed in the public cloud.

In hybrid embodiment, the key server microservice 408 is implemented in a private cloud (e.g. a cloud having storage and processing securely controlled by a first entity managing the key server microservice, and secure from access by other entities) and the software encryption microservice 426 is implemented in a public cloud controlled by a second entity independent from the first. This is afforded by the use of encoded control words being provided by the key server microservice 408 to the software encryption microservice 426, which uses white-box techniques to encrypt the media content without exposing the encryption key. Since the encryption key is not exposed, the encryption process can proceed in the public cloud.

Finally, in a private cloud environment, the cloud clusters 402 and key server microservice 408 are implemented in a private cloud controlled by the same entity.

Key Server Microservice

Figure 6:
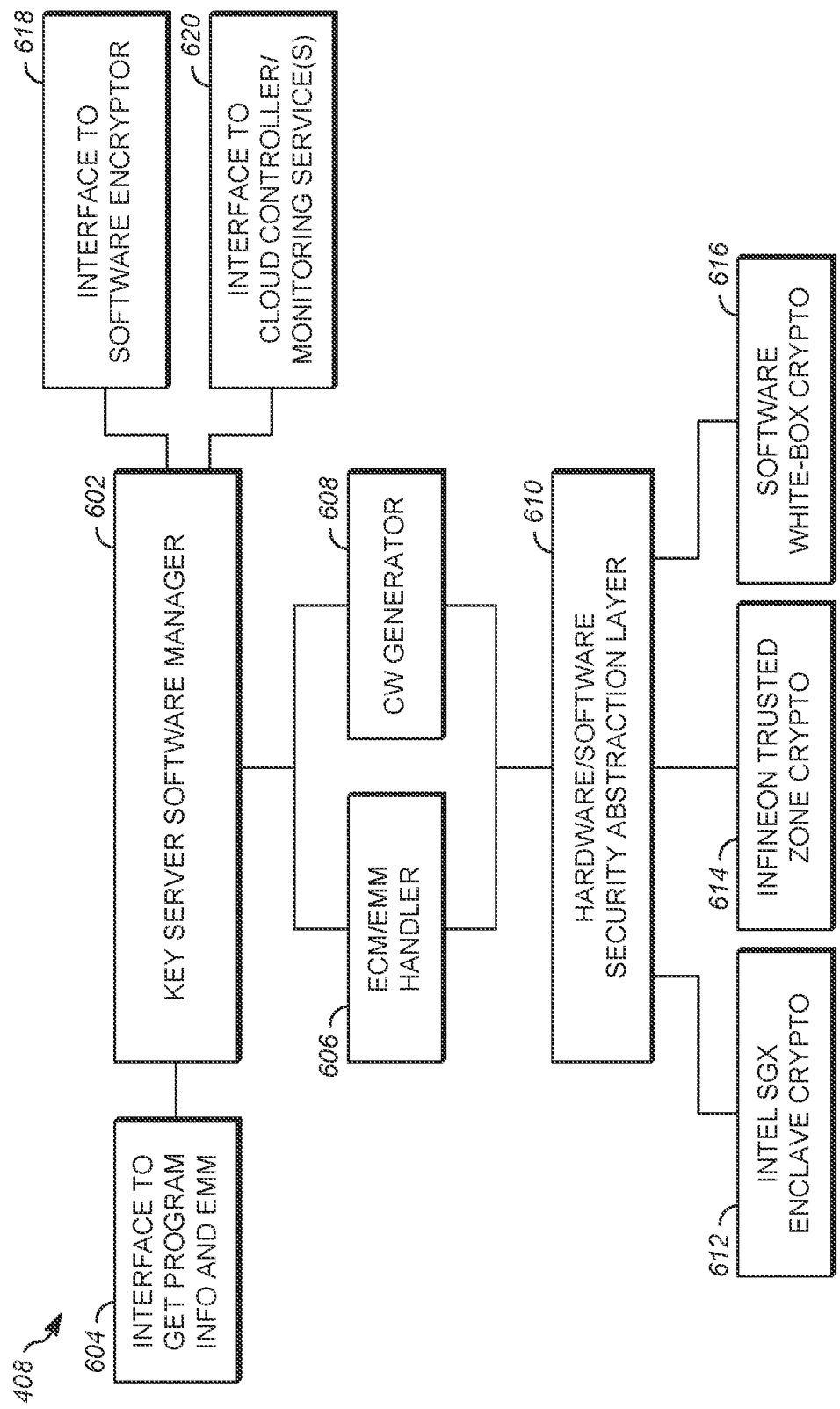
FIG. 6 is a diagram illustrating one embodiment of the key server microservice.

FIG. 6 is a diagram illustrating one embodiment of the key server microservice 408. The key server microservice 408 comprises a key server software manager module 602, that aggregates the other key server microservice 408 components together and creates daemon application. The key server software manager module 602 is communicatively coupled to a media content information interface module 604, an entitlement information handler module 606, a control word generator 608, an encryptor interface module 618, and a controller interface module 620. The program information interface module 604 communicates with other servers, microservices, and modules to acquire the media content information, EMMs and ECMs (when provided and not generated by the key server microservice 408). The control word generator 608 generates control words by using data from program info, and if provided, information provided in the EMMs, and ECMs. The ECM/EMM handler/generator 606 either creates new EMMs and ECMs, or optionally processes incoming EMMs and ECMs. The encryptor interface module 618 provides secure protocol to send data to and receive data from the software encryption microservice 426. Control words (which include, for example, the content key Kc or analogous secret S) are encoded in the white-box obfuscation form (e.g. $\ell(S)$) by the CW generator 608 and can only be used by the associated white-box implemented by the software encryption microservice 426 by its encryptor counterpart. The control word requests and encoded control words may also be further secured by encryption before transmission and decryption upon receipt by the respective software encryption microservice 426 and key server microservice 408. On the key server side, such encryption and decryption is performed by the encryptor interface module 618. The controller interface 620 provides an interface to the cloud control/monitoring service 430 in the cloud to provide configuration and logging data. The ECM/EMM handler 606 and the control word generator 608 are also communicatively coupled to secure elements via a Hardware/Software Security Abstraction Layer 610 that creates abstraction layer to such elements. These elements may include, for example, the low level hardware HSM 414 or trusted execution environment 412 such as Intel SGX Enclave 612 or Infineon Trusted Zone 616. It is also possible to use a white-box encryptor and decryptor to secure messages between the key server microservice 408 and other elements. These crypto elements are used to encrypt messages from the key server microservice 408 and to encrypt messages transmitted from the key server microservice 408 as needed. For example, in embodiments where the control word is provided to the key server as program information from the media content rights server module 406, the control word may be encrypted before transmission to the key server microservice 408. The key server microservice access the required crypto element (HSM 414, TEE 412, or white-box).

Software Encryptor Microservice

Figure 7:
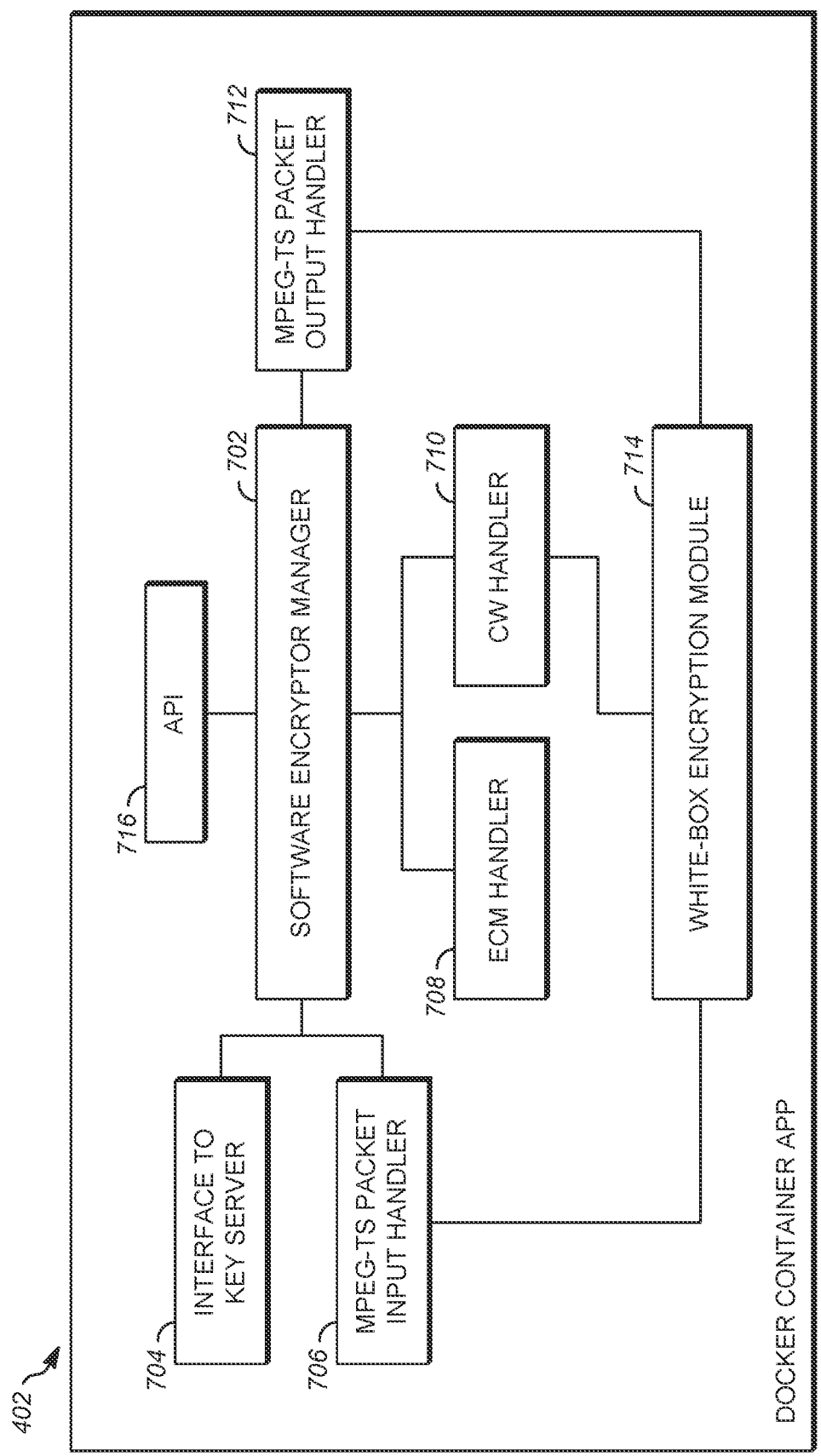
FIG. 7 is a diagram illustrating one embodiment of the software encryption microservice.

FIG. 7 is a diagram illustrating one embodiment of the software encryption microservice 426. The software encryption microservice comprises a software encryption manager 702 that all internal software encryption microservice 426 software modules and creates a containerized application that can be replicated as needed to support large volume. The software encryption manager 702 is communicatively coupled to a key server interface 704, a media content input handler 706, a media content output handler 712, an ECM/EMM handler 708, and a CW handler 710.

The key server microservice interface 704 provides an interface to transmit and receive data between the key server microservice 408 and the software encryption service 426 (e.g. via the software encryptor interface 618 of the key server microservice 408) including encoded CWs. The media content input handler 706 receives and handles multiple or single media content streams (e.g. MPEG2-TS transport streams) and feeds the streams to the white-box encryption module 714. The CW handler 710 accepts encoded control words received from key server microservice 408 via the key server interface 704 and provides the encoded control words to the white-box encryption module 714. The white-box encryption module accepts the encoded control words from the CW handler 710 and media content from the input handler 706, encrypts the media content using the encoded control words using white-box techniques (e.g. accepting the encoded control word (analogous to $\ell(s)$ in FIG. 5B) and encrypts the media content (analogous to $\delta_1(\text{INPUT})$ of FIG. 5B). Thereafter the white-box encryption module 714 provides the encrypted media content to the output handler 712. The EMM/ECM handler 708 inserts EMMs and ECMs into stream as required (e.g. if not already provided by EMMG 418 and ECMG 422 and inserted by processing module 424) to the media content stream.

The output handler module 712 is communicatively coupled to the software encryptor manager 702 and the white-box encryption module 714, and sends the stream including the encrypted media content packets to other components as configured in the cloud cluster. Final, the optional application programming interface module 716 is communicatively coupled to the software encryption manager 702 to provides the functions of the software encryption microservice 402 as a library called by hosting applications.

In one embodiment, the elements of the cloud-based CDS 400 are implemented with each of the plurality of cloud clusters 402 being controlled by a particular service provider or content provider independent from other service providers or content providers. For example, a first service provider or content provider may use a first cloud cluster 402 to encrypt and provide the media content, while a second service provider or content provider uses a second cloud cluster 402 to encrypt and provide their respective media content. Each such cloud cluster 402 has its associated cloud cluster elements (e.g. processor 424 and software encryption microservice 426). A single key server microservice 408 may be used to support any one, a subset, or all of the cloud clusters 402. In one embodiment, each cloud cluster 402 has a dedicated respective key server 408 to receive control word request and provide encoded control words. Also, the cloud control service 430 may control all of the plurality of cloud clusters 402 and related key server microservices 408.

Hardware Environment

Figure 8:
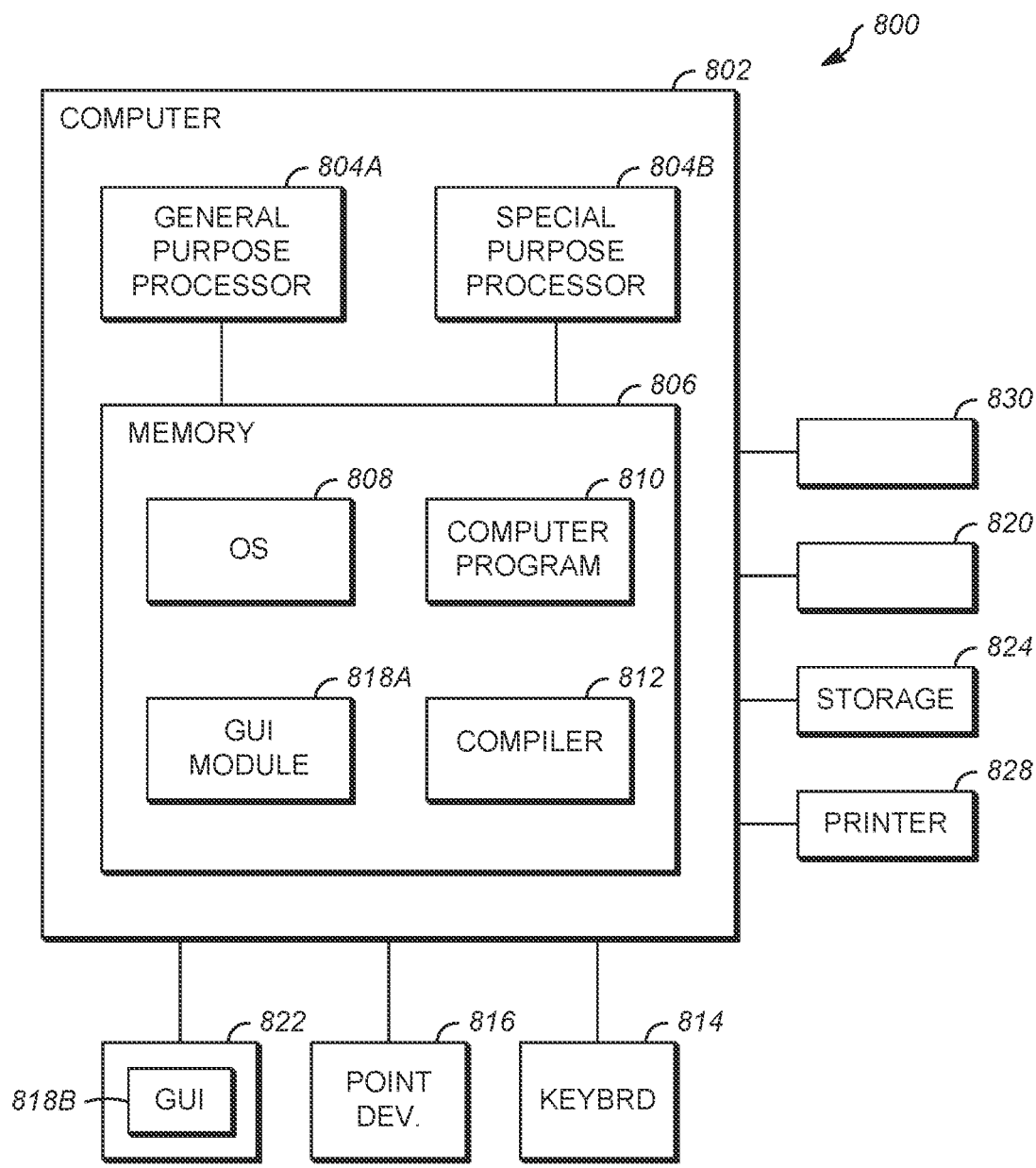
FIG. 8 is a diagram illustrating an exemplary computer system that could be used to implement processing elements of the cloud-based content distribution system.

FIG. 8 illustrates an exemplary computer system 800 that could be used to implement processing elements of the above disclosure, including the encoder server 404, the cloud control monitor service(s) 430, the media content rights module 406, the key server microservice 408, the modulator server 410, and the elements of the cloud clusters 402 including the source multiplexer module 418, the EMMG 418, the ECMG 422, the stream processor 424, the software encryption microservice 426, the HSM 414, the distribution module 428, and the modulator server 410.

The computer 802 comprises a processor 804 and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer 828, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818B is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the operations herein described. Computer program 810 and/or operating instructions may also be tangibly embodied in memory 806 and/or data communications devices 830, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing discloses an apparatus, method, and system for encrypting media content. The apparatus comprises: a key server microservice, for receiving control word requests and for generating encoded control words; and a software encryption microservice, communicatively coupled to the key server microservices, the software encryption microservice for receiving the media content, for generating the control word requests, for receiving the encoded control words, and for white-box encrypting the media content according to the generated encoded control words; wherein the key server microservice and the encryption microservice are hosted in a cloud.

Implementations may include one or more of the following features:

Any of the systems described above, wherein the cloud is a private cloud hosted by a first entity.

Any of the systems described above, wherein: the cloud includes a private cloud hosted by a first entity and a public cloud hosted by a second entity; and the key server microservice is hosted in the private cloud and the software encryption microservice is hosted in the public cloud.

Any of the systems described above, wherein the encoded control words are provided from the key server microservice to the software encryption microservice via a first communication path independent from a second communication path in which the media content is received.

Any of the systems described above, wherein the key server microservice further generates entitlement control information authorizing access to the media content and further provides the entitlement control information to the software encryption microservice for distribution.

Any of the systems described above, wherein: the media content is provided by a media content provider; the key server microservice further includes: a media content information interface, for: receiving entitlement information having an encrypted control word; receiving media content information; an entitlement management information handler module, for: receiving entitlement information having the encrypted control word; decrypting the encrypted control word.

Any of the systems described above, may also include a control word generator for accepting the entitlement information from the entitlement management information handler module and for generating the encoded control words according to the entitlement information.

Any of the systems described above, wherein: the key server microservice includes: a security abstraction layer, for interfacing with a secure processor for decrypting the encrypted control word.

Any of the systems described above, wherein: the secure processor includes one of a media provider specific hardware security module and a trusted execution environment for decrypting the encrypted control word.

Any of the systems described above, wherein: the key server microservice and the software encryption microservice communicate according to a json format via restful application programming interfaces.

Another embodiment is evidenced by a method for encrypting media content, including: receiving, in a key server microservice hosted in a cloud computing environment, a request to generate an encoded control word for encrypting media content; generating, in the key server microservice, the encoded control word according to entitlement information; transmitting the encoded control word to a software encryption microservice hosted in the cloud; and white-box encrypting the media content according to the encoded control word in the software encryption microservice.

Implementations may include one or more of the following features:

Any of the methods described above, wherein: the cloud is a private cloud hosted by a first entity.

Any of the methods described above, wherein: the cloud includes a private cloud hosted by a first entity and a public cloud hosted by a second entity; and the key server microservice is hosted in the private cloud and the software encryption microservice is hosted in the public cloud.

Any of the methods described above, wherein: the method further includes: receiving a media content stream having the media content in the software encryption microservice; and wherein the encoded control words are provided from the key server microservice to the software encryption microservice via a first communication path independent from a second communication path in which the media content stream is received.

Any of the methods described above, wherein: the method further includes: receiving media content information; receiving entitlement information having an encrypted control word; decrypting the encrypted control word; and the encoded control word is generated according to the received entitlement information, the media content information, and the decrypted control word.

Any of the methods described above, wherein the encrypted control word is decrypted via a media provider specific hardware security module.

Any of the methods described above, wherein: the method further includes: receiving media content information; generating entitlement information including the control word; and wherein generating, in the key server microservice, the encoded control word according to entitlement information includes: generating the encoded control word according to the generated entitlement information.

Still another embodiment is evidenced by a method for encrypting media content, including: transmitting, to a key server microservice hosted in a cloud computing environment, a request to generate an encoded control word for encrypting media content; receiving the encoded control word to a software encryption microservice hosted in the cloud, the encoded control word generated by the key server microservice according to entitlement information; and white-box encrypting the media content according to the encoded control word in the software encryption microservice.

Implementations may include one or more of the following features:

Any of the methods described above, wherein the cloud is a private cloud hosted by a first entity.

The method wherein: the cloud includes a private cloud hosted by a first entity and a public cloud hosted by a second entity; and the key server microservice is hosted in the private cloud and the software encryption microservice is hosted in the public cloud.

Any of the methods described above, the method further includes: receiving a media content stream having the media content in the software encryption microservice.

Any of the methods described above, wherein the encoded control words are provided from the key server microservice to the software encryption microservice via a first communication path independent from a second communication path in which the media content stream is received.

Any of the methods described above, wherein: the encoded control word is generated according to received entitlement information, media content information and an encrypted control word received by the key server microservice, the encrypted control word decrypted by the key server microservice.

Any of the methods described above, wherein the encrypted control word is decrypted via a media provider specific hardware security module of the key server microservice.

Any of the methods described above, wherein: the encoded control word is generated by the key server microservice according to: entitlement information including the control word, the entitlement information generated in the key server microservice; and media content information received in the key server microservice.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A system, using a processor including a hardware security module, for encrypting media content, comprising:
 a key server microservice, for receiving control word requests and for generating encoded control words; and
 a software encryption microservice, communicatively coupled to the key server microservice, the software encryption microservice for receiving the media content, for generating the control word requests, for receiving the encoded control words, and for white-box encrypting the media content according to the generated encoded control words;
 wherein the key server microservice and the encryption microservice are hosted in a cloud; and
 the encoded control words are generated by the key server microservice according to entitlement information.

2. The system of claim 1, wherein the cloud is a private cloud hosted by a first entity.

3. The system of claim 1, wherein:
 the cloud comprises a private cloud hosted by a first entity and a public cloud hosted by a second entity; and
 the key server microservice is hosted in the private cloud and the software encryption microservice is hosted in the public cloud.

4. The system of claim 1, wherein the encoded control words are provided from the key server microservice to the software encryption microservice via a first communication path independent from a second communication path in which the media content is received.

5. The system of claim 1, wherein the key server microservice further generates entitlement control information authorizing access to the media content and further provides the entitlement control information to the software encryption microservice for distribution.

6. A method for encrypting media content, comprising:
 receiving, in a key server microservice hosted in a cloud computing environment, a request to generate an encoded control word for encrypting media content;
 generating, in the key server microservice, the encoded control word according to entitlement information;
 transmitting the encoded control word to a software encryption microservice hosted in the cloud; and
 white-box encrypting the media content according to the encoded control word in the software encryption microservice.

7. The method of claim 6, wherein the cloud is a private cloud hosted by a first entity.

8. The method of claim 6, wherein:
 the cloud comprises a private cloud hosted by a first entity and a public cloud hosted by a second entity; and
 the key server microservice is hosted in the private cloud and the software encryption microservice is hosted in the public cloud.

9. The method of claim 6, wherein:
 the method further comprises:
 receiving a media content stream having the media content in the software encryption microservice; and
 wherein the encoded control words are provided from the key server microservice to the software encryption microservice via a first communication path independent from a second communication path in which the media content stream is received.

10. The method of claim 6, wherein:
 the method further comprises:
 receiving media content information;
 receiving entitlement information having an encrypted control word;
 decrypting the encrypted control word; and
 the encoded control word is generated according to the received entitlement information, the media content information, and the decrypted control word.

11. The method of claim 10, wherein the encrypted control word is decrypted via a media provider specific hardware security module.

12. The method of claim 6, wherein:
 the method further comprises:
 receiving media content information;
 generating entitlement information including the control word; and wherein generating, in the key server microservice, the encoded control word according to entitlement information comprises:

generating the encoded control word according to the generated entitlement information.

13. A method for encrypting media content, comprising:

transmitting, to a key server microservice hosted in a cloud computing environment, a request to generate an encoded control word for encrypting media content;

receiving the encoded control word to a software encryption microservice hosted in the cloud, the encoded control word generated by the key server microservice according to entitlement information; and white-box encrypting the media content according to the encoded control word in the software encryption microservice.

14. The method of claim 13, wherein the cloud is a private cloud hosted by a first entity.

15. The method of claim 13, wherein:

the cloud comprises a private cloud hosted by a first entity and a public cloud hosted by a second entity; and the key server microservice is hosted in the private cloud and the software encryption microservice is hosted in the public cloud.

16. The method of claim 13, wherein:

the method further comprises:

receiving a media content stream having the media content in the software encryption microservice; and wherein the encoded control words are provided from the key server microservice to the software encryption microservice via a first communication path independent from a second communication path in which the media content stream is received.

17. The method of claim 16, wherein:

the encoded control word is generated according to received entitlement information, media content information and an encrypted control word received by the key server microservice, the encrypted control word decrypted by the key server microservice.

18. The method of claim 17, wherein the encrypted control word is decrypted via a media provider specific hardware security module of the key server microservice.

19. The method of claim 13, wherein:

the encoded control word is generated by the key server microservice according to:

the entitlement information including the control word, the entitlement information generated in the key server microservice; and media content information received in the key server microservice.

* * * * *